(12) United States Patent
Smith et al.

(10) Patent No.: US 10,449,812 B2
(45) Date of Patent: Oct. 22, 2019

(54) TIRE PRESSURE COLD CHECK SYSTEM

(71) Applicant: ELDEC Corporation, Lynnwood, WA (US)

(72) Inventors: Bradley Smith, Lynnwood, WA (US);
Mark Finefrock, Lynnwood, WA (US);
Jeffrey Green, Lynnwood, WA (US);
Jonathan Lumb, Lynnwood, WA (US)

(73) Assignee: ELDEC Corporation, Lynwood, WA (US)

( * ) Notice: Subject to any disclaimer, the term of this patent is extended or adjusted under 35 U.S.C. 154(b) by 71 days.

(21) Appl. No.: 15/127,777

(22) PCT Filed: Mar. 23, 2015

(86) PCT No.: PCT/US2015/022076
§ 371 (c)(1),
(2) Date: Sep. 20, 2016

(87) PCT Pub. No.: WO2015/143451
PCT Pub. Date: Sep. 24, 2015

(65) Prior Publication Data
US 2017/0096037 A1      Apr. 6, 2017

Related U.S. Application Data

(60) Provisional application No. 61/968,973, filed on Mar. 21, 2014.

(51) Int. Cl.
*G01L 19/12* (2006.01)
*B60C 23/04* (2006.01)

(52) U.S. Cl.
CPC ...... *B60C 23/0476* (2013.01); *B60C 23/0488* (2013.01); *B60C 2200/02* (2013.01)

(58) Field of Classification Search
CPC ............ B60C 23/0476; B60C 23/0494; B60C 23/0496; G01L 17/00; G01L 19/12
See application file for complete search history.

(56) References Cited

U.S. PATENT DOCUMENTS

| | | |
|---|---|---|
| 5,717,135 A | 2/1998 | Fiorletta et al. |
| 6,868,358 B2 | 3/2005 | Brown, Jr. |
| 7,225,666 B2 | 6/2007 | Welch et al. |
| 7,490,793 B2 | 2/2009 | Mackness |
| 7,518,493 B2 | 4/2009 | Bryzek et al. |
| 7,945,422 B2 | 5/2011 | Vetsch |

(Continued)

OTHER PUBLICATIONS

International Search Report and Written Opinion dated Jun. 26, 2015, issued in corresponding International Application No. PCT/US2015/022076, filed Mar. 23, 2015, 7 pages.

*Primary Examiner* — Peter J Macchiarolo
*Assistant Examiner* — Alexander A Mercado
(74) *Attorney, Agent, or Firm* — Christensen O'Connor Johnson Kindness, PLLC; Ryan E. Dodge, Jr.

(57) ABSTRACT

Cold check gas pressure readings for the landing gear tires of an aircraft are obtained automatically during normal operation of the aircraft. The automated system (S1, e.g.) includes monitoring aircraft data to determine that the aircraft is at rest on the ground (32,345,36), and electronically monitoring the tire pressure (24). When predetermined cold check conditions have been met; the tire pressure values are automatically stored with a timestamp (38) for later access by a user.

20 Claims, 9 Drawing Sheets

(56) References Cited

U.S. PATENT DOCUMENTS

| | | | |
|---|---|---|---|
| 2004/0046649 A1* | 3/2004 | Sanchez | B60C 23/0433 340/443 |
| 2004/0075022 A1* | 4/2004 | MacKness | B60C 23/0408 244/100 R |
| 2004/0181327 A1* | 9/2004 | Tsosie | B60R 25/25 701/36 |
| 2008/0024287 A1 | 1/2008 | Boyle et al. | |
| 2008/0154442 A1* | 6/2008 | Wipplinger | G01C 21/30 701/3 |
| 2011/0233992 A1 | 9/2011 | Hino | |
| 2013/0278771 A1 | 10/2013 | Magoun et al. | |
| 2015/0224831 A1 | 8/2015 | Miller | |

* cited by examiner

TIRE PRESSURE COLD CHECK SYSTEM

CROSS-REFERENCE TO RELATED APPLICATION

This application claims the benefit of Provisional Application No. 61/968,973, filed Mar. 21, 2014; the disclosure of said application is hereby expressly incorporated by reference herein.

BACKGROUND

The present invention pertains to monitoring aircraft tire pressure.

The importance of maintaining proper aircraft tire pressure is illustrated by the fatal crash of a Bombardier Learjet Model 60 aircraft on Sep. 19, 2008, in Columbia, S.C. The investigation into the cause of the crash, and the circumstances and findings of the accident investigation are described in an article by Linda Werfelman, titled "Pressure Check," published in the May 2010 issue of *Aerosafety World Magazine* (http://flightsafety.org/aerosafety-world-magazine/may-2010/pressure-check). In summary, multiple tire failures occurred during the takeoff roll, prompting the crew to reject the takeoff, but the airplane overran the runway safety area. The airplane was destroyed; two crew members and two passengers were killed; and the other two passengers were seriously injured.

The accident investigation found that the four main landing gear (MLG) tires had been installed less than one year earlier. The rated tire inflation pressure was 220 psi. Tests of tires of that type (Goodyear "Flight Eagle") showed that the tires had a documented daily pressure loss of 2.2%, as compared to the maximum allowable tire pressure loss of 5% per day. Maintenance logs indicated that the plane had been flown on five days during the 12 days preceding the accident. Tests conducted after the accident indicated that the MLG tires were underinflated by about 36%. Interviews with personnel from all facilities that handled the accident airplane during the previous 12 days found that no one had serviced or received a request to service the MLG tires. The National Transportation Safety Board (NTSB) noted that the aircraft maintenance manual called for a tire to be replaced if it was operated with a pressure deficit of 15% or more.

On the Learjet 60, checking tire pressure was considered a job for maintenance personnel, not flight crew members, and required a technician to "crouch or crawl under the wing of the airplane to gain access to the MLG tire pressure valves requiring a person to lie on the ground to gain access," partly because the landing gear doors may conceal the valves for the outboard tires. Nevertheless, instructions for "daily or regular" checks of tire pressure are included in instructions in the Learjet 60 maintenance manual and other Learjet and Goodyear tire maintenance publications, as well as Federal Aviation Administration (FAA) "Advisory Circulars." Although pre-flight tasks for pilots typically include visually inspecting the tires for general condition (such as excessive wear, sidewall bulges, or visible tire cord), it is accepted that even dangerous underinflation may not be visible and can only be detected with tire pressure checks. For even properly functioning tires that have a pressure loss of, for example, 5% each day, it may take only a few days for the tires to reach an underinflation level below what the aircraft maintenance manual specifies for tire replacement. Consequently, instructions and/or regulations typically mandate that pressure checks be performed frequently, such as every three to five days, and such checks should be "cold checks," i.e., checks conducted after tires have been at rest for a substantial period (at least two hours in the case of the Goodyear tires on the Learjet 60).

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a method of capturing cold check gas pressure readings for an aircraft tire during normal operation. In general, the method includes automated operation to monitor aircraft data to determine that an aircraft is at rest on the ground. The gas pressure of a tire is monitored electronically, and when predetermined cold check conditions have been met; the tire pressure value is automatically stored with a timestamp for later access by a user.

In one aspect of the invention, the method is performed by automatically measuring the tire gas pressure when the aircraft has been determined to be continuously at rest on the ground for a predetermined cold check time period.

In another aspect of the invention, the method is performed by automatically monitoring the temperature of a wheel rim for the tire to determine if the rim temperature is within predefined tolerance to outside air temperature.

In still another aspect of the invention, the method is performed by automatically determining if the tire gas pressure or the rim temperature has stabilized within a predetermined tolerance by comparing current tire gas pressure or rim temperature to a calculated running average.

In yet another aspect of the invention, the method is performed by calculating a "tire corrected pressure" as a function of the temperature of the wheel rim, the outside air temperature, and the ideal gas law to determine an approximation of what the cold check tire gas pressure would, such determination being made before the tire has fully cooled down.

The stored cold check pressure value and associated timestamp can be periodically updated when the predetermined conditions are met.

One or more of the aspects set forth above can be performed at the same time to optimize the accuracy and/or obtain a reliable cold check pressure as soon as possible after a tire is heated during landing and taxi.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
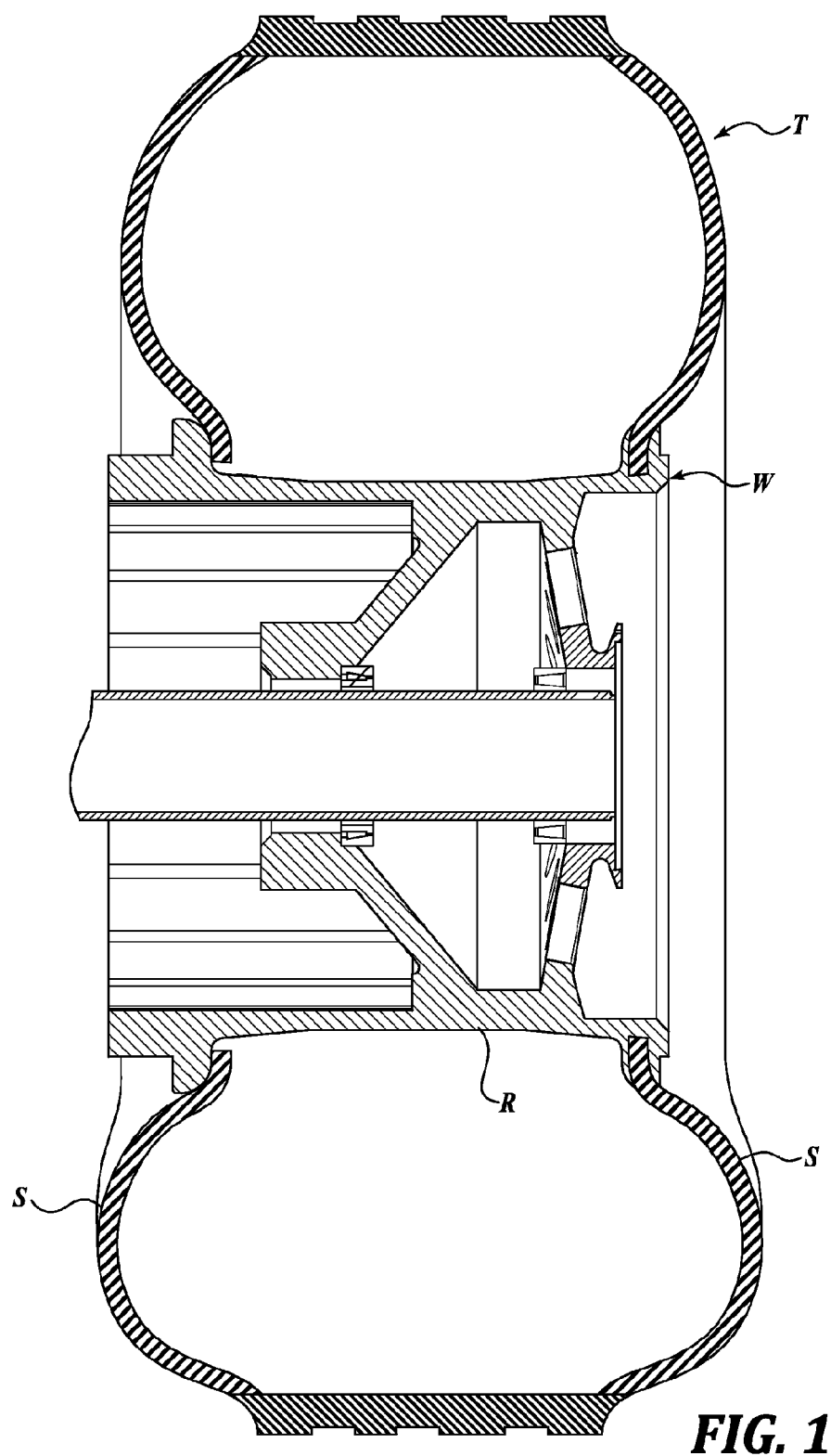
FIG. 1 is a diagrammatic, vertical, axial section through an aircraft tire-wheel assembly.

The present invention provides an automated system for determining the "cold check" pressure of an in-service aircraft tire. With reference to FIG. 1, a tire T of a transport category airplane typically is made from rubber, flexible nylon ply, or some similar material, and steel bead wires, and can be filled with nitrogen. These tires operate with high inflation pressures, and are designed to withstand the heavy load requirements and high speeds that prevail during take-off and landing. As the tires rotate under load, they produce heat, largely because of the friction generated during tire deflection (the shifting of the axle-to-ground distance after a tire is installed). Overinflation of a tire can cause uneven tread wear, reduced traction, make the tire more susceptible to cutting, and can increase the stress on the associated aircraft wheel W and landing gear components. More common is underinflation, which may cause a tire's sidewalls S to over-deflect at the bottom of each rotation. Excessive flexing of the sidewalls can result in fatigue of the reinforcing fibers and generate higher internal temperatures at a faster rate than would be generated in a properly inflated, properly loaded tire. High temperatures can degrade the physical properties of the tire's compounds and melt the nylon threads in the plies, which can lead to catastrophic failure. There also can be heat transfer through the wheel rim R, which may be heated during braking, for example.

Figure 2:
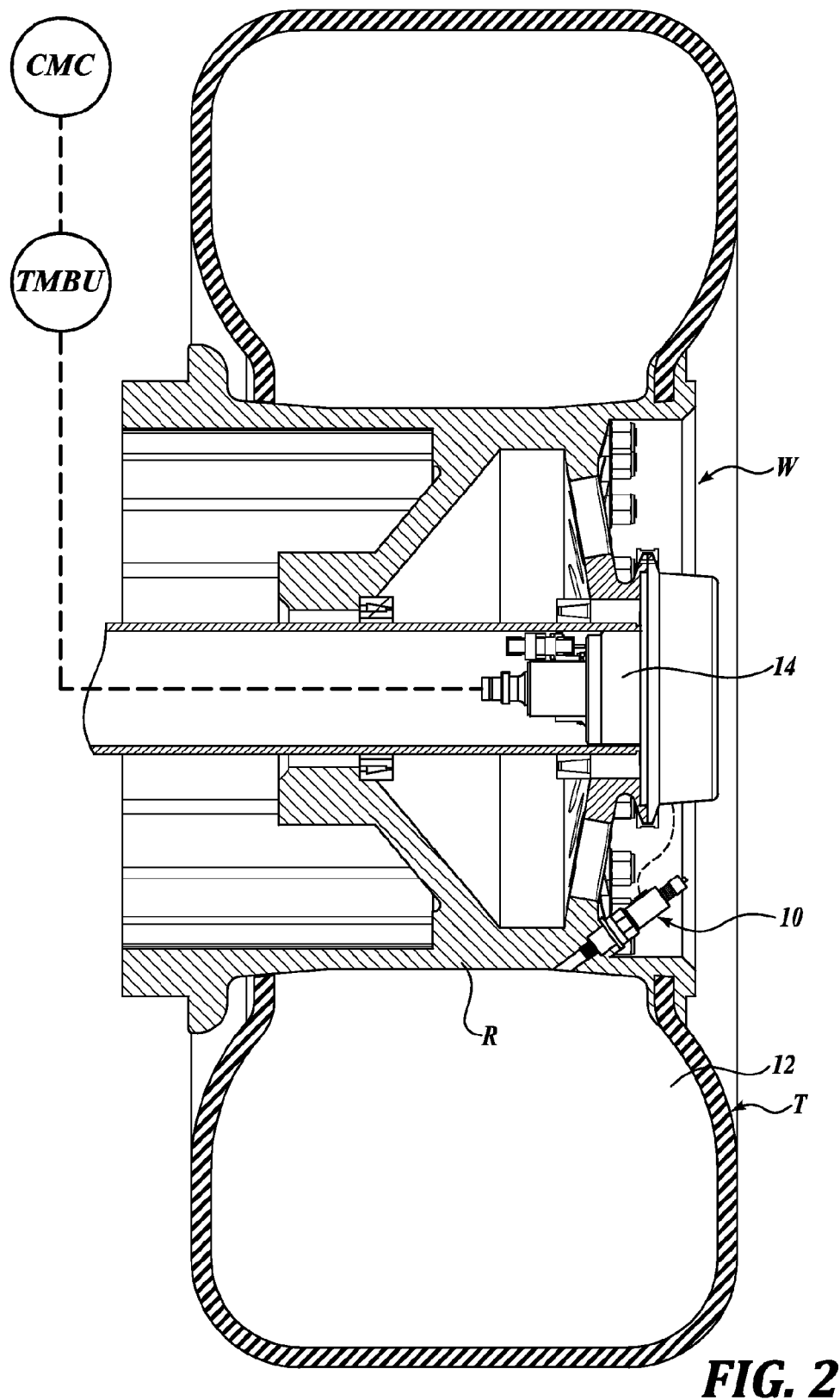
FIG. 2 is a diagrammatic, vertical, axial section corresponding to FIG. 1 but further including a tire pressure sensor component associated with the aircraft wheel, and data transmission and processing components.
Figure 3:
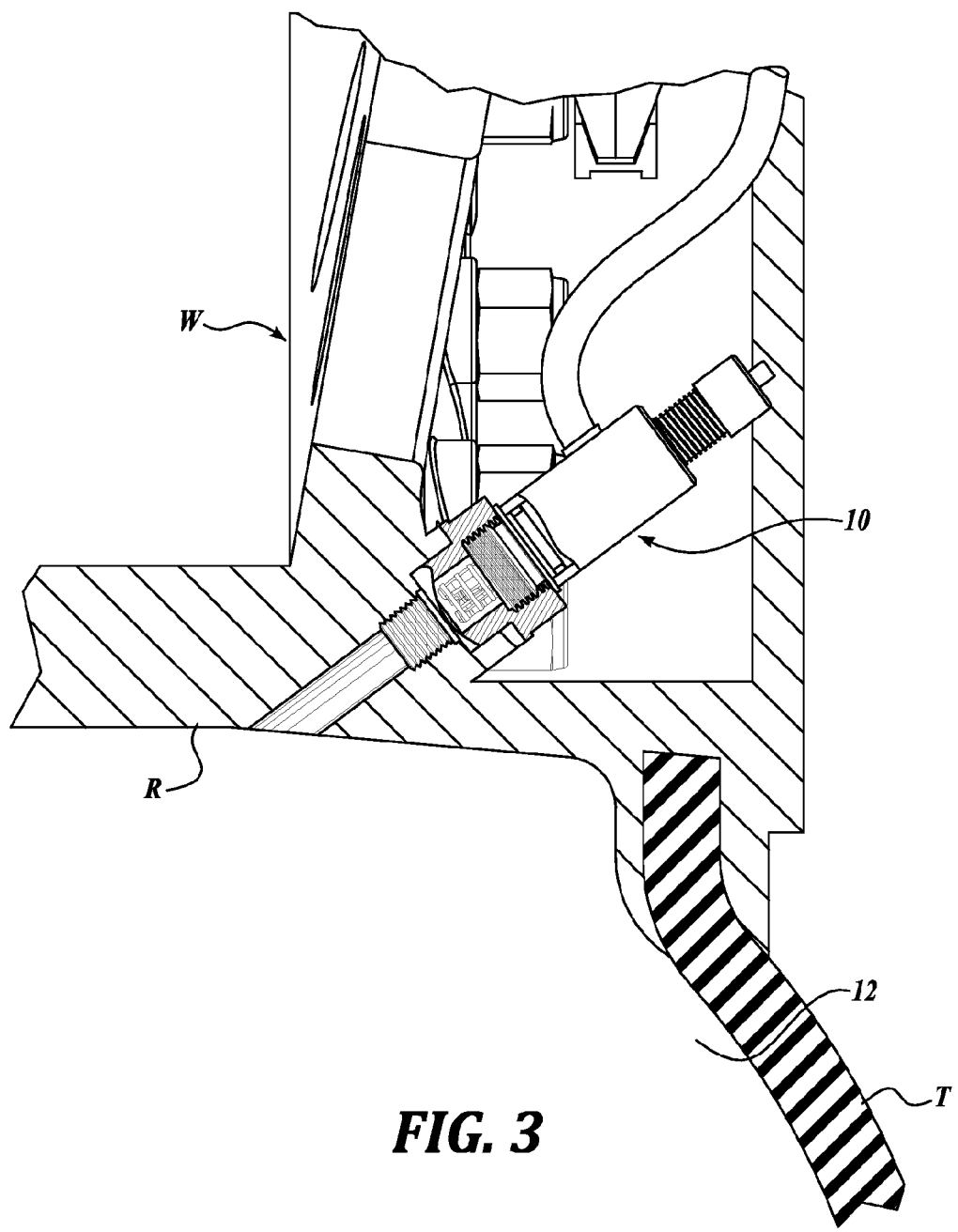
FIG. 3 is an enlarged, fragmentary, detail section of the pressure sensor component shown diagrammatically in FIG. 2, and the immediate surrounding wheel structure.

Aspects of one representative embodiment of the present invention are illustrated diagrammatically in FIGS. 2 and 3. In general, a pressure sensing unit 10 has pressure sensors or transducers exposed to the internal volume 12 of the tire T. The sensor can be mounted in the tire inflation valve wheel rim port and include a temperature sensor to detect the wheel rim temperature. Signals indicative of the sensed pressure and temperature are conveyed to a hub signal-receiving and transmitting component or assembly 14, and from there to a tire, brake, and pressure monitoring unit (TBMU). The TBMU provides the digital interface to a central maintenance computer (CMC) which can include a cockpit display. Additional functionality can be provided for the TBMU and/or CMC, namely, an outside air temperature (OAT) sensor, wheel speed indicator, clock functions, data storage components, and so on, although many of these may already be available from the aircraft monitoring systems. In general terms, one system in accordance with the present invention determines that the tire has been on the ground at rest for a period sufficient that a valid cold check pressure can be obtained, and automatically measures the tire pressure and stores it with a timestamp for later access. At the time of access by maintenance personnel or a pilot, for example, the cold check conditions need not be present. Rather, the technician can determine the previous cold check measurement automatically taken, and, preferably, the length of time since the previous valid cold check.

As described in more detail below, tire pressure data can be captured at regular intervals, or only when valid cold check conditions are present. Cold check conditions can be as simple as a predetermined period of time since an "at rest" condition has been sensed (actuation of a parking brake, lack of detected rotation while under load, and so on), as described below with reference to FIG. 4. Additionally, or alternatively, the opportunistic cold check condition can be determined by comparison of outside air temperature to wheel rim temperature and/or by pressure and/or temperature stabilization. The TBMU can monitor the wheel rim temperature and tire pressure over time and, in one example, signal an appropriate cold check condition when rim temperature is close to outside air temperature, described below with reference to FIG. 5, or signal when the wheel rim temperature has stabilized, described below with reference to FIG. 6. Such systems also can rely on tire pressure stabilization (such as readings differing by no more than +/−1 psi for 15 minutes).

The TBMU components can broadcast a signal of tire pressure substantially continuously (such as every 4 seconds), determine the valid cold check period, broadcast the cold check data, and indicate to the CMC that it should store the cold check data as the most recent cold check, for later access.

In an another alternative embodiment, the CMC can receive the TBMU broadcasts of pressure and temperature(s), determine a valid cold check period based on an appropriate algorithm, and calculate an equivalent cold check pressure for later access, described below with reference to FIGS. 7-9.

In any of the automated systems, the tire may not be in a valid cold check condition state at the time of access of the data. This greatly simplifies the procedure of obtaining and monitoring cold check pressure data. For example, modern commercial aircraft may not spend sufficient time at the gate to enable a proper cold check to be conducted, and at layover may be at a location without maintenance personnel available or trained in cold check pressure monitoring. In an automated system in accordance with the present invention, the operator can access, read, and interpret the data to determine if service action is required. Such data can include the date and time of the last cold check, outside air temperature at time of cold check, and pressure and temperature, for each tire, at the time of the cold check.

In a more sophisticated system, the CMC may indicate required service action, if any, for each tire. Service actions could include: no action required; reinflate; replace (such as if a tire rolled while below the lower inflation limit, and/or lost pressure at a rate greater than a predetermined rate). Service actions can be color coded on a cockpit display, such as green for no action, yellow for reinflate, red for replace.

The TBMU and/or CMC can be programmed to indicate trend information which can include a prediction of the time for the next tire service, an indication of the leak rate for each tire, and the frequency for which the tire requires inflation to remain within predetermined recommended pressure limits. Additional data recorded and accessible can include one or more of the last inflation date; date of last wheel change; number of flight cycles per wheel; number of brake applications per wheel; mileage per wheel; minimum and maximum pressures and temperatures per wheel; wheel serial number; and tire pressure sensor (TPS) part data and status.

The automated opportunistic cold check system increases opportunities for capturing valid cold check readings, allows verification of the cold check interval during normal operations, reduces time constraints on the maintenance personnel, and can be implemented with intuitive displays and similar procedures.

Alternatively or additionally, an automated system can use an algorithm by means of which cold check pressure can be calculated when the normal cold check conditions are not present, by calculation of the "temperature corrected pressure" (TCP) for a "warm" tire. In addition to high airport ambient temperature, elevated gas temperature within a tire (resulting in a higher pressure reading) is affected by friction during rolling of the tire, speed, and, as noted above, sidewall deflection, and heat transfer through the wheel rim when braking. A temperature change of 5° F. produces a pressure change of about 1%, but there are additional factors that must be considered in order to correlate pressure at an elevated temperature to what the pressure would be when the tire is "cold." The TCP can be used alone to indicate whether or not tire maintenance or replacement is required, or at least provide cautionary information between cold pressure checks.

Figure 4:
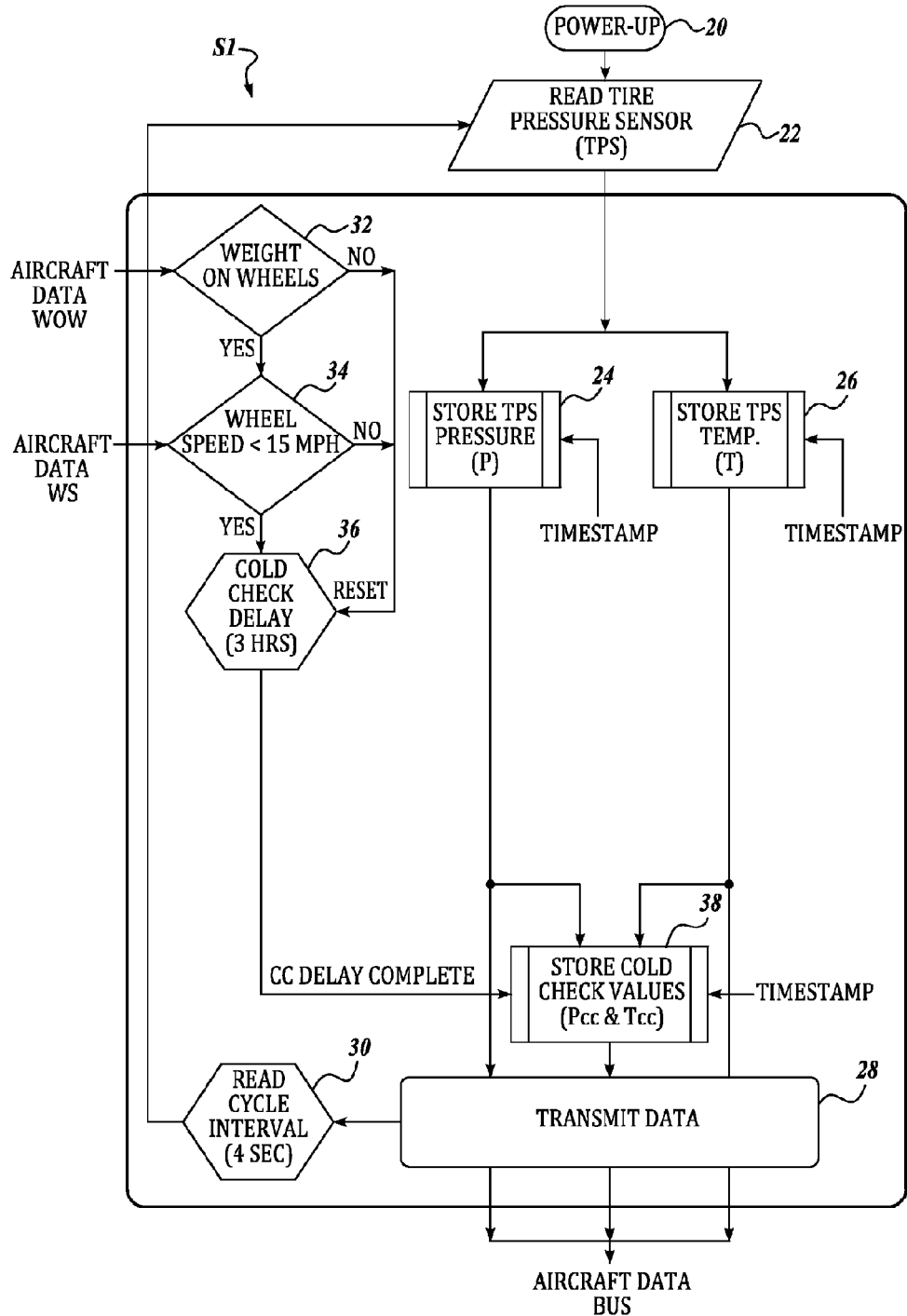
FIG. 4 is a logic diagram illustrating operation of one embodiment of the present invention.

More specifically, with reference to FIG. 4, an automated aircraft tire pressure monitoring system S1 in accordance with the present invention can detect and record tire pressure data automatically when the appropriate time delay has occurred. At power up of the aircraft CMC (box 20), the current tire pressure is detected (box 22). The system cycles to steps of storing the current pressure with a current time stamp (box 24) and also the temperature (box 26). In the present invention, the "TPS Temp" is the wheel rim temperature. These values are transmitted to the aircraft databus as indicated at box 28, such as by RFID or any other appropriate transmission method known to those skilled in the art, and thereby to the CMC. In a representative embodiment the values are transmitted at a short read cycle time such as every four seconds (indicated at box 30).

As compared to the instantaneous (every four seconds) readings, the automated opportunistic system of FIG. 4 also detects when appropriate cold check conditions are present. In the illustrated embodiment, data from aircraft control systems are evaluated to determine if the aircraft is on the ground ("weight on wheels" or WOW, box 32) and wheel speed is at or near zero (less than 15 MPH in the representative embodiment, box 34) and these conditions have been present for the requisite cold check period (such as three hours in a representative aircraft, box 36). Low wheel speed is allowed because it will not contribute substantially to tire warming. If all three conditions are met, the tire pressure, wheel rim temperature and a time stamp are stored separately (box 38). In a representative system, a running average of a predetermined sequence of cold check qualifying data will be preserved, such as the average of the latest five cold check measurements (using the same four second read cycle interval, for example) and the time stamp of the most recent of those five. If any of the cold check conditions is not met (WOW, wheel speed, cool down time period), no cold check value will be stored at box 38 and this aspect of the routine resets.

The system is active for each aircraft wheel, with each wheel having a unique identifier. At start up, the pilot/technician will be able to see the current pressure and temperature information and also the latest automated cold check measurement. This allows verification of the cold check interval and reduces time constraints on the maintenance personnel. It is much less likely that a costly delay will be incurred because the routine maintenance was delayed or the plane was at a location where such personnel were not available. Often this will allow the next layover to be shorter and not be delayed for proper tire pressure monitoring. Furthermore, it is much more likely that an inflation problem will be detected sooner so that corrective action can be taken because the tire pressure is monitored at every possible appropriate time, regardless of the location of the layover.

Figure 5:
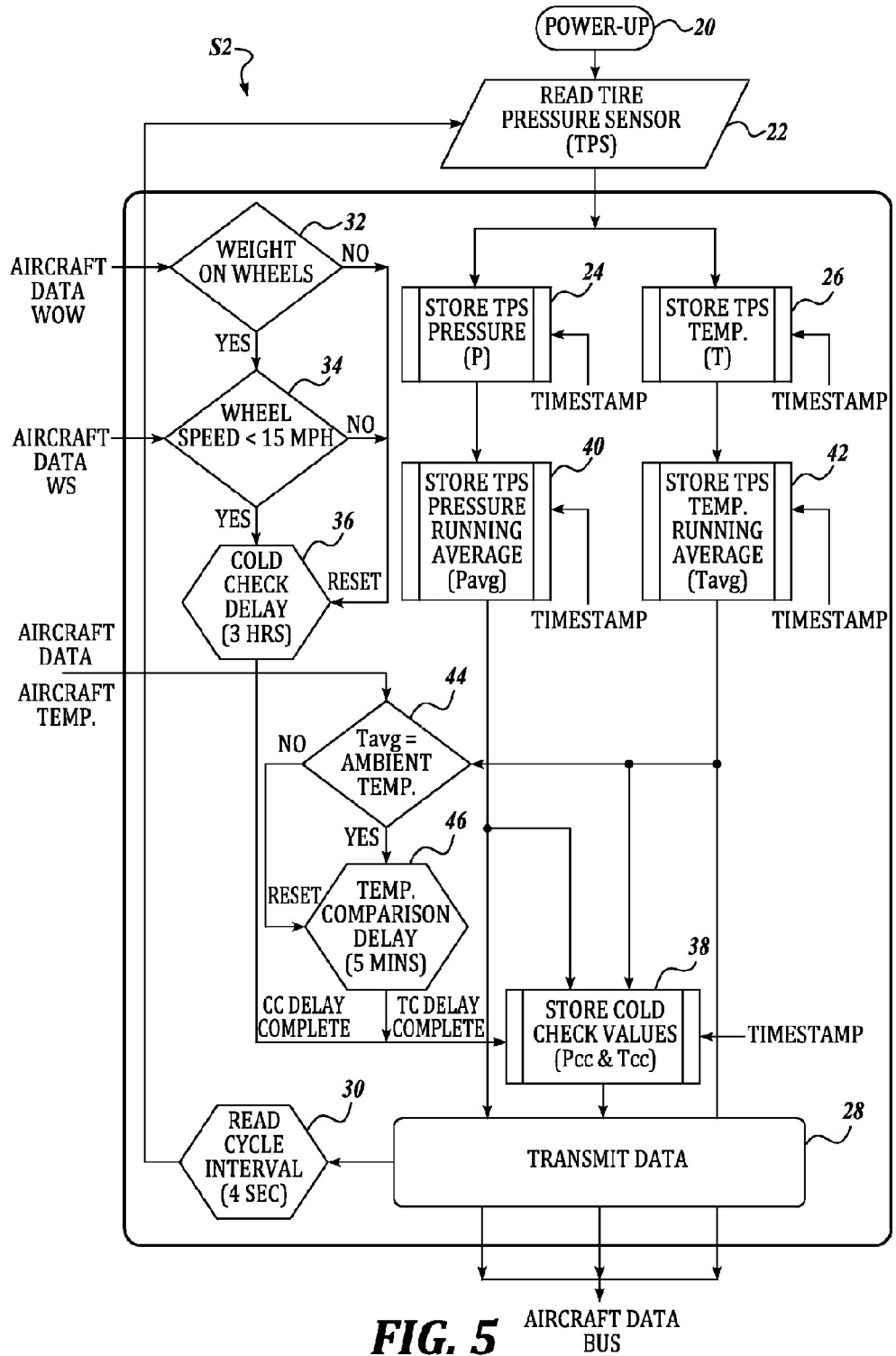
FIG. 5 is a logic diagram illustrating operation of a second embodiment of the present invention.

With reference to FIG. 5, an alternative embodiment of an automated aircraft tire pressure monitoring system S2 in accordance with the present invention can detect and record tire pressure data automatically when temperature stabilization has occurred, by monitoring and comparing ambient temperature with wheel rim temperature. As in the previously described embodiment, at power up of the aircraft CMC (box 20), the current tire pressure is detected (box 22). The system cycles to steps of storing the current pressure with a current time stamp (box 24) and also the temperature (box 26). Again, the "TPS Temperature" is the wheel rim temperature. In the embodiment of FIG. 5, running averages of pressure and rim temperature are calculated and stored with the most recent timestamp (boxes 40 and 42), such as for the five most recent readings, and the running average values are transmitted to the aircraft databus as indicated at box 28, such as by RFID or any other appropriate transmission method known to those skilled in the art. In a representative embodiment the values are transmitted at a short read cycle time such as every four seconds (indicated at box 30).

As compared to the instantaneous readings, the automated opportunistic system of FIG. 5, like the previously described embodiment, also detects when appropriate cold check conditions are present. Data from aircraft control systems are evaluated to determine if the aircraft is on the ground ("weight on wheels" or WOW, box 32), zero or low wheel speed (box 34) and the requisite cold check clock period (box 36).

At the same time, the running average temperature data from box 42 is compared to ambient temperature (which can be obtained from the aircraft control or maintenance systems) as indicated at box 44. The goal is to assure rim temperature and ambient temperature are sufficiently close (a difference of no more than a small predetermined amount, such as +/−3° centigrade) that sufficient tire cooling has occurred for a reliable cold check of the tire pressure. A temperature comparison delay (box 46) is provided to filter out momentary changes in temperature readings. In the FIG. 5 embodiment, when either the time based cool down period or the temperature stabilization condition has been met, the tire pressure data and associated timestamp are stored as cold check values.

Figure 6:
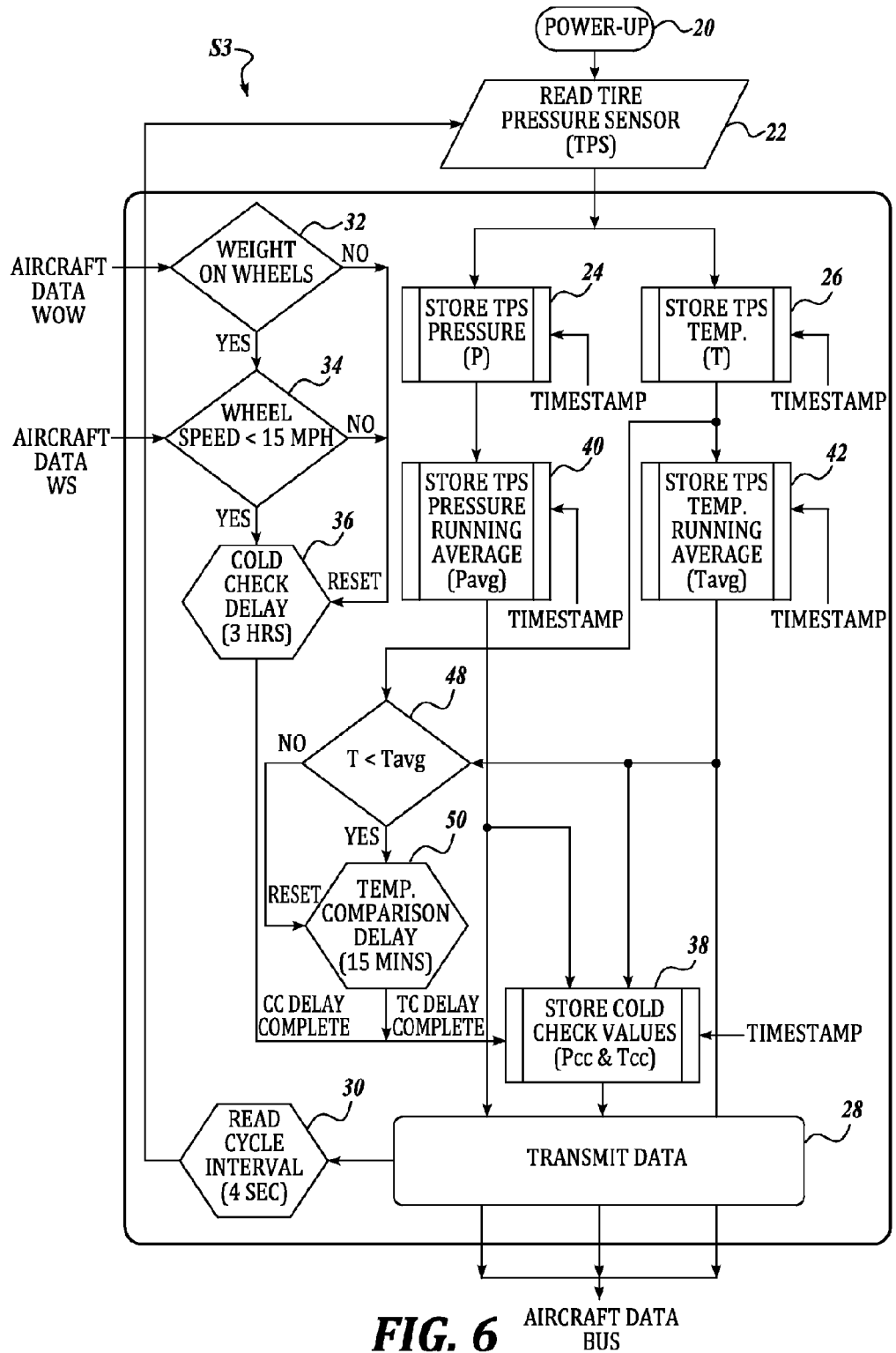
FIG. 6 is a logic diagram illustrating operation of a third embodiment of the present invention.

With reference to FIG. 6, an alternative embodiment of an automated aircraft tire pressure monitoring system S3 in accordance with the present invention can detect and record tire pressure data automatically when temperature stabilization has occurred, by monitoring wheel rim temperature without reference to ambient temperature. As in the previously described embodiments, at power up of the aircraft CMC (box 20), the current tire pressure is detected (box 22). The system cycles to steps of storing the current pressure with a current time stamp (box 24) and also the wheel rim temperature (box 26). As in the embodiment of FIG. 5, running averages of pressure and rim temperature are calculated and stored with the most recent timestamp (boxes 40 and 42), and the running average values are transmitted to the aircraft databus as indicated at box 28.

The automated opportunistic system of FIG. 6, like the previously described embodiments, also detects when appropriate cold check conditions are present. Data from aircraft control systems are evaluated to determine if the aircraft is on the ground ("weight on wheels" or WOW, box 32), zero or low wheel speed (box 34) and the requisite cold check clock period (box 36).

At the same time, the running average temperature data from box 42 is monitored and periodically compared as indicated at boxes 48 and 50. If wheel rim temperature variation is negligible over a predetermined period (such as no variation greater than 1° centigrade over a period of 15 minutes), sufficient tire cooling has occurred for a reliable cold check of the tire pressure. The temperature comparison delay (box 50) can be adjusted based on cooling characteristics observed for the aircraft being evaluated. In the FIG. 6 embodiment, when either the time based cool down period or the temperature stabilization condition has been met, the tire pressure data and associated timestamp are stored as cold check values.

An alternative in the system of FIG. 5 or FIG. 6 can be a routine to monitor for tire pressure stabilization (such as readings differing by no more than +/-1 psi for 15 minutes) instead of or in addition to temperature stabilization.

Figure 7:
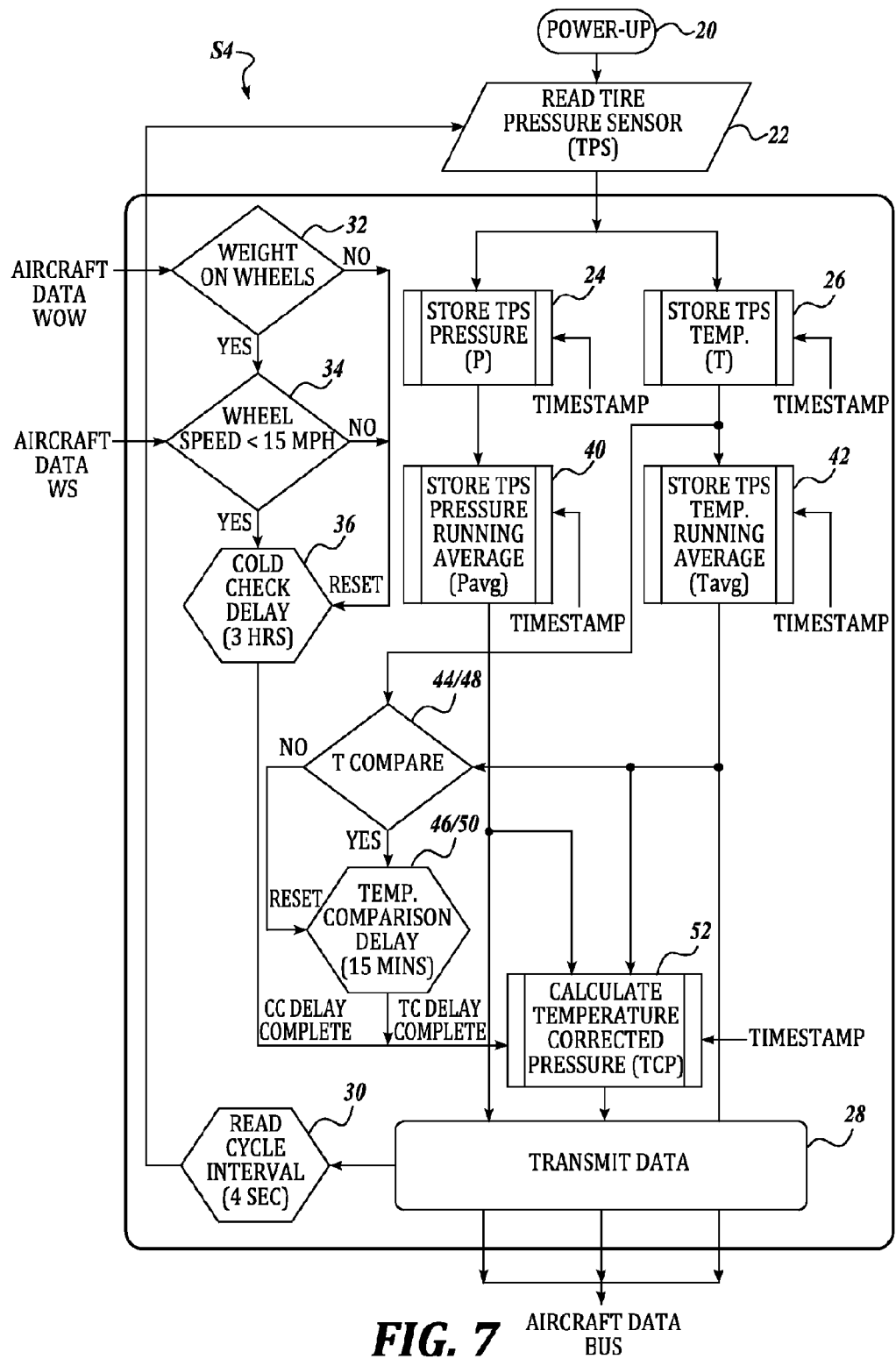
FIG. 7 is a logic diagram illustrating operation of a fourth embodiment of the present invention.

With reference to FIG. 7, an alternative embodiment of an automated aircraft tire pressure monitoring system S4 in accordance with the present invention calculates a "temperature corrected pressure" (TCP) which corresponds to the equivalent cold check pressure for each tire, but before the traditional cold check conditions have been met. In a representative implementation, aspects of the previously described embodiments may be used. For example, at power up of the aircraft CMC (box 20), the current tire pressure can be detected (box 22). The system can cycle to steps of storing the current pressure with a current time stamp (box 24) and also the wheel rim temperature (box 26). As in the embodiments of FIG. 5 and FIG. 6, running averages of pressure and rim temperature are calculated and stored with the most recent timestamp (boxes 40 and 42), and the running average values are transmitted to the aircraft databus as indicated at box 28.

The automated system of FIG. 7, like the previously described embodiments, may also detect when traditional cold check conditions are present. Data from aircraft control systems can be evaluated to determine if the aircraft is on the ground ("weight on wheels" or WOW, box 32), zero or low wheel speed (box 34) and the requisite cold check clock period (box 36).

Optionally, at the same time, the running average temperature data from box 42 can be monitored and evaluated either by the comparison to ambient temperature as in the system of FIG. 5 or the stabilization evaluation as in the system of FIG. 6, but in the system of FIG. 7 temperature and pressure parameters are used to calculate the TCP (box 52) which can be used as a cold check value.

Figure 8:
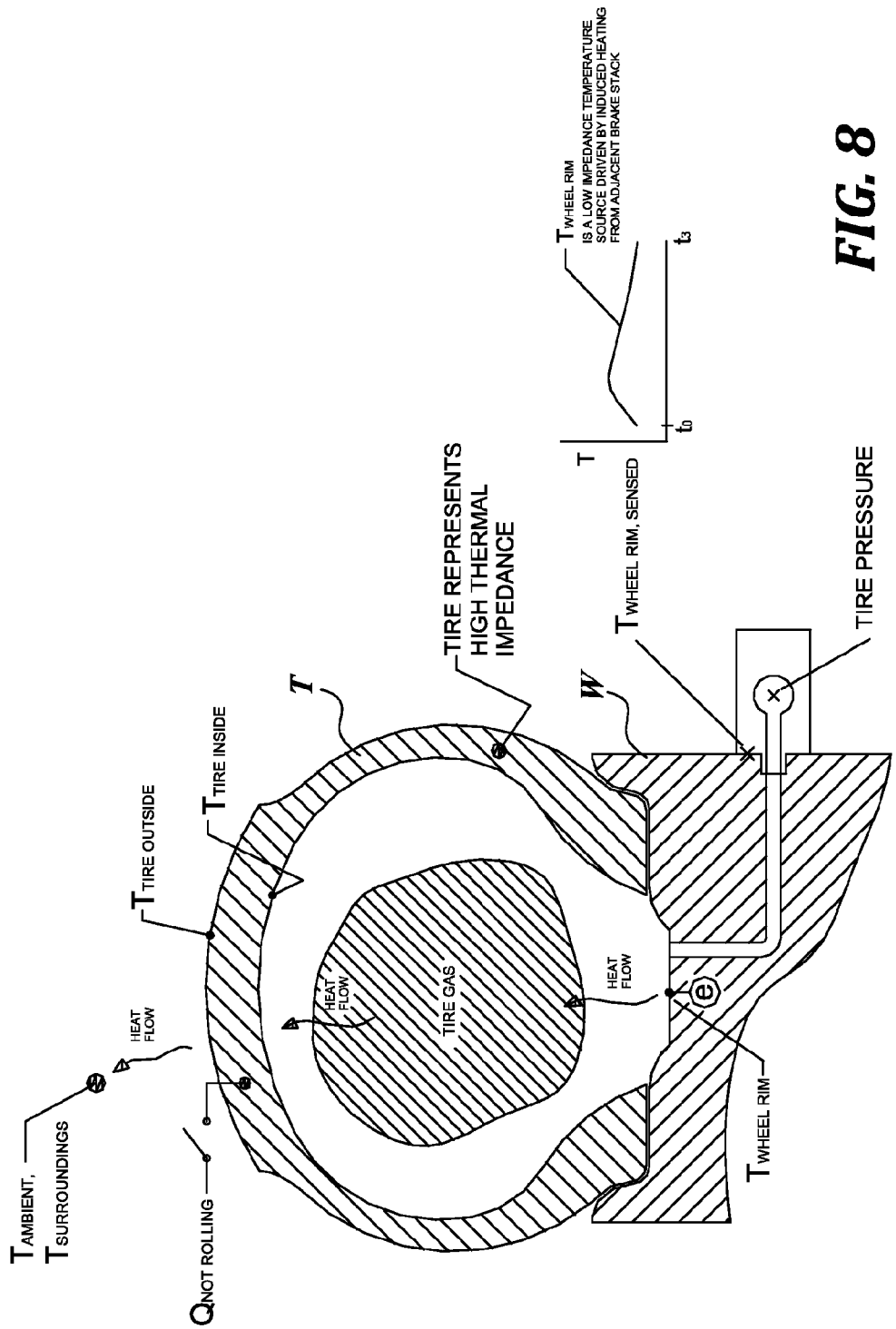
FIG. 8 is a thermal model cross section of an aircraft tire-wheel assembly roughly illustrating factors for calculating tire pressure in accordance with the fourth embodiment of present invention.

FIG. 8 illustrates aspects of the system thermal dynamics that can be used in determining the calculation of TCP. Primary factors affecting tire pressure are as follows: after touchdown of the aircraft, an early increase in internal gas temperature is caused by tire sidewall deflection augmented by friction between the outside of the tire and the runway. Friction increases as the brakes are applied, and typically the brake stack accumulates a high degree of heat energy, some of which is conductively, convectively and radiantly coupled to the wheel rim. Wheel rim heat energy is convectively transferred directly to the tire interior gas and also to the inside surface of the tire. The tire interior gas has a low thermal mass and therefore the temperature of the gas closely follows the temperature of the tire interior surface. During cool down the aircraft is stationary and thus frictional heating within the tire composite structure ceases. As the wheel rim temperature begins to decrease, the wheel rim represents a very high capacity and high conductivity thermal source which convectively and radiantly drives the tire inside temperature to proportionally follow the wheel rim temperature. A predictable temperature gradient develops between the tire inside and outside due to a limited portion of the rim induced energy that is conducting through the tire composite structure and then radiating from the tire outside surface to ambient air temperature. The exact (or approximate) time at which the proportionality relationship exists will depend on the particular aircraft, landing gear design (including braking system), ambient temperature, and tire characteristics, which can be monitored and measured.

Figure 9:
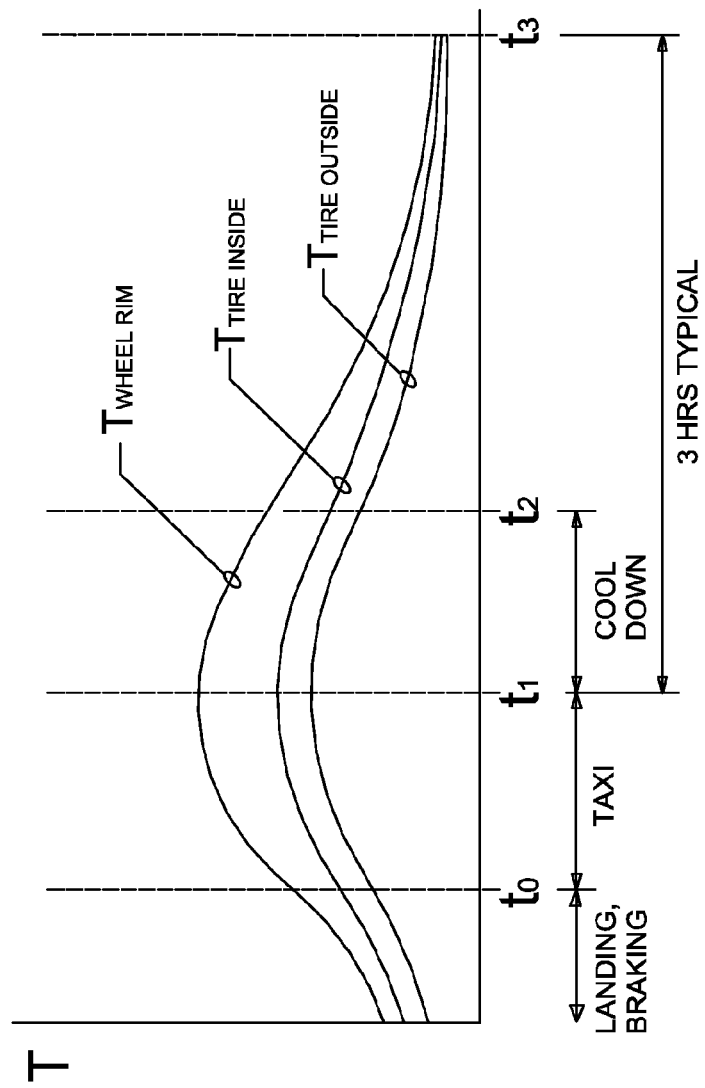
FIG. 9 is a graph roughly illustrating three temperature factors during a landing and cool down sequence for an aircraft tire-wheel assembly.

The graph of FIG. 9 illustrates the relationship of three of the factors during a landing and cool down sequence, namely wheel rim temperature, tire inside temperature, and tire outside temperature. T1 is the start of the cool down period, after landing, braking, and taxi. For a traditional cold check, the mandatory wait (three hours in this example) begins at T1 (wheel speed zero) and ends at T3. The system in accordance with FIG. 4 uses this wait period but has the advantage of automatically acquiring and storing the cold check value. The systems of FIG. 5 and FIG. 6 can allow a valid cold check to be obtained sooner when it is detected that less than the predetermined wait (e.g., less than three hours) was needed for cool down (a great advantage not only because the cold check is automated but also because of the lesser delay). The system of FIG. 7 further shortens the delay by allowing a safe pressure check before cool down has been completed (represented at T2 in FIG. 9). T2 is the time at which cooling has occurred sufficiently that the temperature gradient is predictable and can be calculated. At that point the ideal gas law can be used to predict the equivalent cold check pressure value which will be the value at the time the rim temperature cools to the ambient temperature. Using the thermal model properties, TCP can be calculated as a function of time, ambient temperature, rim temperature, and the ideal gas law.

First, determine the Tire Inside temperature:

$$T_{Inside} = f_1(T_{TPS}, T_{Ambient});$$

where the function ($f_1$) is based on the thermal dynamic model properties as described herein, and parametrically tailored to the applicable aircraft landing gear design.

Second, correct the raw TPS pressure data using the known Ideal Gas Law relationship, and noting that this invention provides the means to determine the Inside Tire Temperature ($T_{Inside}$) as determined in step 1:

$$TCP = f_2(P_{TPS}, T_{Inside});$$

where the function ($f_2$) is based on the Ideal Gas Law and the knowledge that tire inside volume is essentially constant for this pressure data correction purpose.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for opportunistically detecting and recording tire cold check condition ("CCC") pressure and temperature for an aircraft wheel assembly of an aircraft, wherein the aircraft is configured to monitor a ground speed of the aircraft and to detect if the aircraft is on the ground, and further wherein the wheel assembly includes a wheel, a tire, a wheel temperature sensor, and a tire air pressure sensor, the method comprising:

while the aircraft is on the ground: i) periodically detecting a tire air pressure and a corresponding wheel temperature and storing the detected air pressure and wheel temperature with a detection time stamp; and ii) calculating a corresponding running average air pressure and a corresponding running average wheel temperature of a predetermined number of the periodically detected air pressures and wheel temperatures, and storing the running average air pressure and the running average wheel temperature with a time stamp;

for each detected tire air pressure and corresponding wheel temperature, if the aircraft has been on the ground and the monitored ground speed has not exceeded a predetermined maximum speed for a predetermined cold check delay period, storing the detected tire air pressure and the corresponding wheel temperature as a CCC pressure and temperature; and for each detected tire air pressure and corresponding wheel temperature, as soon as the corresponding calculated running average temperature is within a predetermined number of degrees of an ambient temperature, storing the detected tire air pressure and the corresponding wheel temperature as a CCC pressure and temperature.

2. The method of claim 1, wherein periodically detecting and storing the tire air pressure and the corresponding wheel temperature comprises detecting and storing the pressure and temperature at least every four seconds.

3. The method of claim 1, wherein the predetermined number of the periodically detected air pressures and wheel temperatures comprises at least five of the detected pressures and wheel temperatures.

4. The method of claim 1, wherein the predetermined maximum speed is less than fifteen miles per hour.

5. The method of claim 1, wherein the predetermined cold check delay period is at least three hours.

6. The method of claim 1, wherein the predetermined number of degrees comprises three degrees.

7. The method of claim 1, wherein the step of storing the running average temperature and the corresponding running average pressure as a CCC pressure and temperature is only performed if the running average temperature is within the predetermined number of degrees from the ambient temperature for at least fifteen minutes.

8. The method of claim 1, wherein the step of storing the running average temperature and the corresponding running average pressure as a CCC pressure and temperature is only performed if the running average temperature has not changed by more than a predetermined amount for a predetermined period of time.

9. The method of claim 8, wherein the predetermined amount is at least three degrees Fahrenheit.

10. The method of claim 9, wherein the predetermined period of time is at least fifteen minutes.

11. A system for opportunistically detecting and recording tire cold check condition ("CCC") pressure and temperature for a wheel assembly for an aircraft comprising a wheel and a tire mounted on the wheel, wherein the aircraft is configured to monitor a ground speed of the aircraft and to detect if the aircraft is on the ground, the system comprising:

a sensor assembly comprising a temperature sensor and a pressure sensor mounted in a tire inflation valve wheel rim port of the wheel, wherein:

while the aircraft is on the ground i) periodically detecting a tire air pressure and a corresponding wheel temperature and storing the detected air pressure and wheel temperature with a detection time stamp, and ii) calculating a running average air pressure and a corresponding running average wheel temperature of a predetermined number of the periodically detected air pressures and wheel temperatures, and storing the running average air pressure and the running average wheel temperature with a corresponding time stamp;

for each detected tire air pressure and corresponding wheel temperature, if the aircraft has been on the ground and the monitored ground speed has not exceeded a predetermined maximum speed for a predetermined cold check delay period, storing the detected tire air pressure and the corresponding wheel temperature as a CCC pressure and temperature; and for each detected tire air pressure and corresponding wheel temperature, as soon as the corresponding calculated running average temperature is within a predetermined number of degrees of an ambient temperature, storing the detected tire air pressure and the corresponding wheel temperature as a CCC pressure and temperature.

12. The system of claim 11, wherein periodically detecting and storing the tire air pressure and the corresponding wheel temperature comprises detecting and storing the pressure and temperature at least every four seconds.

13. The system of claim 11, wherein the predetermined number of the periodically detected air pressures and wheel temperatures comprises at least five of the detected pressures and wheel temperatures.

14. The system of claim 11, wherein the predetermined maximum speed is less than fifteen miles per hour.

15. The system of claim 11, wherein the predetermined cold check delay period is at least three hours.

16. The system of claim 11, wherein the predetermined number of degrees comprises three degrees.

17. The system of claim 11, wherein the step of storing the running average temperature and the corresponding running average pressure as a CCC pressure and temperature is only performed if the running average temperature is within the predetermined number of degrees from the ambient temperature for at least fifteen minutes.

18. The system of claim 11, wherein the step of storing the running average temperature and the corresponding running average pressure as a CCC pressure and temperature is only performed if the running average temperature has not changed by more than a predetermined amount for a predetermined period of time.

19. The system of claim 18, wherein the predetermined amount is at least three degrees Fahrenheit.

20. The system of claim 19, wherein the predetermined period of time is at least fifteen minutes.

* * * * *